US012760667B2

(12) United States Patent
Peters et al.

(10) Patent No.: US 12,760,667 B2
(45) Date of Patent: Oct. 13, 2026

(54) FLUID DELIVERY SYSTEM FOR SUPPLYING FLUID TO A MACHINE ASSEMBLY

(71) Applicant: Schwäbische Hüttenwerke Automotive GmbH, Aalen (DE)

(72) Inventors: Sven Peters, Bad Schussenried (DE); Gerd Jäggle, Ertingen (DE); Enis Kostic, Bad Buchau (DE); Harald Kunzi, Winnenden (DE)

(73) Assignee: SCHWÄBISCHE HÜTTENWERKE AUTOMOTIVE GMBH, Aalen (DE)

( * ) Notice: Subject to any disclaimer, the term of this patent is extended or adjusted under 35 U.S.C. 154(b) by 0 days.

(21) Appl. No.: 18/112,045

(22) Filed: Feb. 21, 2023

(65) Prior Publication Data

US 2023/0287811 A1 Sep. 14, 2023

(30) Foreign Application Priority Data

Mar. 11, 2022 (DE) ..................... 10 2022 105 783.6

(51) Int. Cl.
*F01M 1/02* (2006.01)
*F01M 1/10* (2006.01)
(Continued)

(52) U.S. Cl.
CPC ................ *F01M 1/02* (2013.01); *F01M 1/10* (2013.01); *F01M 5/002* (2013.01);
(Continued)

(58) Field of Classification Search
CPC .......................... F01M 1/02; F01M 2001/126; F16H 57/0435; F16H 57/0436; F16H 57/0441
See application file for complete search history.

(56) References Cited

U.S. PATENT DOCUMENTS 2,373,360 A * 4/1945 Walsh ...................... F01M 1/02 184/6.13
2,873,734 A * 2/1959 Scheiterlein ............. F01M 1/02 123/195 A (Continued)

FOREIGN PATENT DOCUMENTS

CN 110177930 A 8/2019
CN 113847240 A 12/2021

(Continued)

OTHER PUBLICATIONS

Extended European Search Report for European Application No. 23 160 222.8, dated Aug. 3, 2023 with translation, 11 pages.

(Continued)

*Primary Examiner* — Minh Truong
(74) *Attorney, Agent, or Firm* — Buchanan Ingersoll & Rooney PC

(57) ABSTRACT

A fluid delivery system for supplying fluid to a machine assembly includes: a pump module; a drive for the pump module; and a housing which includes a reservoir for the fluid. The reservoir includes an aspiration point, and the pump module includes a first inlet, a second inlet, a first outlet and a second outlet. The first inlet is fluidically connected to the reservoir via a first suction conduit, and the first outlet is fluidically connected to the machine assembly via a first pressure conduit. The second inlet is fluidically connected to the housing via a second suction conduit, and the second outlet is fluidically connected to the reservoir via a second pressure conduit.

18 Claims, 6 Drawing Sheets

(51) Int. Cl.

| | |
|---|---|
| ***F01M 5/00*** | (2006.01) |
| ***F01M 11/00*** | (2006.01) |
| ***F16H 57/04*** | (2010.01) |

(52) U.S. Cl.

CPC ..... *F01M 11/0004* (2013.01); *F16H 57/0404* (2013.01); *F16H 57/0415* (2013.01); *F16H 57/0436* (2013.01); *F16H 57/0452* (2013.01); *F01M 2001/0215* (2013.01); *F01M 2001/0253* (2013.01); *F01M 2001/1028* (2013.01)

(56) References Cited

U.S. PATENT DOCUMENTS

| | | | | | |
|---|---|---|---|---|---|
| 3,961,614 | A * | 6/1976 | Rameau | F01M 1/02 | 123/195 A |
| 4,915,070 | A * | 4/1990 | Okui | F02B 75/20 | 123/196 R |
| 5,551,389 | A | 9/1996 | Kahrs et al. | | |
| 2002/0003063 | A1* | 1/2002 | Ito | F01M 1/12 | 123/196 R |
| 2004/0244760 | A1 | 12/2004 | Kawamoto et al. | | |
| 2006/0207542 | A1* | 9/2006 | Takano | F02B 75/06 | 123/196 R |
| 2015/0343346 | A1 | 12/2015 | Sheridan | | |
| 2016/0305606 | A1 | 10/2016 | Thorén | | |
| 2016/0369853 | A1* | 12/2016 | Sugiura | F01M 1/10 | |
| 2017/0107872 | A1 | 4/2017 | McGowan et al. | | |
| 2017/0234483 | A1 | 8/2017 | Mallette et al. | | |
| 2018/0347418 | A1 | 12/2018 | Miyazaki | | |
| 2019/0242341 | A1 | 8/2019 | Anderson et al. | | |
| 2020/0208776 | A1* | 7/2020 | Bayyouk | F16N 7/38 | |
| 2020/0300132 | A1* | 9/2020 | Gatti | F01M 1/02 | |
| 2021/0404466 | A1 | 12/2021 | Welte | | |
| 2024/0117874 | A1* | 4/2024 | Yamamoto | F16H 57/0476 | |
| 2024/0229924 | A1* | 7/2024 | Greiter | F16H 57/0424 | |
| 2024/0333104 | A1* | 10/2024 | Greiter | F16H 57/0476 | |
| 2024/0339895 | A1* | 10/2024 | Krank | F16N 7/40 | |

FOREIGN PATENT DOCUMENTS

| | | | | |
|---|---|---|---|---|
| DE | 10014368 | A1 | 10/2001 | |
| DE | 102005020959 | A1 | 11/2006 | |
| DE | 102006017924 | A1 | 10/2007 | |
| DE | 102014006004 | A1 | 7/2015 | |
| DE | 102016113519 | A1 | 1/2018 | |
| DE | 102019128957 | A1 | 4/2021 | |
| DE | 102021133902 | A1 * | 6/2023 | F16H 57/0453 |
| EP | 0 844 141 | A2 | 5/1998 | |
| EP | 1598531 | A1 | 11/2005 | |
| EP | 3 093 533 | A2 | 11/2016 | |
| EP | 3205839 | A1 | 8/2017 | |
| EP | 3543476 | A1 | 9/2019 | |
| JP | H0694805 | B2 | 11/1994 | |
| WO | 2019077463 | A1 | 4/2019 | |

OTHER PUBLICATIONS

Extended European Search Report for European Application No. 23 160 236.8, dated Aug. 3, 2023 with translation, 11 pages.

German Search Report issued in German Patent Application No. 10 2022 105 783.6, mailed Sep. 30, 2022, 10 pages. (Partial English translation).

German Search Report issued in German Patent Application No. 102022 105 782.8, mailed Nov. 9, 2022, 9 pages. (Partial English translation).

Office Action issued by the U.S. Patent and Trademark Office in the U.S. Appl. No. 18/113,220, mailed Jun. 10, 2024, U.S. Patent and Trademark Office, Alexandria, VA. (12 pages).

Office Action issued by the U.S. Patent and Trademark Office in the U.S. Appl. No. 18/113,220, mailed Mar. 5, 2025, U.S. Patent and Trademark Office, Alexandria, VA. (11 pages).

Office Action issued by the U.S. Patent and Trademark Office in the U.S. Appl. No. 18/113,220, mailed Jul. 14, 2025, U.S. Patent and Trademark Office, Alexandria, VA. (11 pages).

Office Action issued by the U.S. Patent and Trademark Office in the U.S. Appl. No. 18/113,220, mailed Feb. 13, 2026, U.S. Patent and Trademark Office, Alexandria, VA. (9 pages).

Office Action (First Notification of Office Action) issued Mar. 26, 2026, by the National Intellectual Property Administration, P. R. China in corresponding Chinese Patent Application No. 202310204148.6 and an English translation of the Office Action. (18 pages).

Notice of Allowance issued by the U.S. Patent and Trademark Office in the U.S. Appl. No. 18/113,220, mailed Jun. 24, 2026, U.S. Patent and Trademark Office, Alexandria, VA. (8 pages).

* cited by examiner

FLUID DELIVERY SYSTEM FOR SUPPLYING FLUID TO A MACHINE ASSEMBLY

CROSS REFERENCE TO RELATED APPLICATION

This application claims benefit of priority from German Patent Application No. 10 2022 105 783.6, filed Mar. 11, 2022. The contents of this application are incorporated herein by reference.

FIELD OF THE INVENTION

The invention relates to a fluid delivery system for supplying fluid to at least one machine assembly, in particular an engine and/or transmission of a motor vehicle. The invention relates in particular to supplying fluid, in particular oil, to a machine assembly in order to lubricate and/or cool the machine assembly. The fluid delivery system comprises: a housing which comprises a reservoir for storing the fluid; and a pump module for delivering the fluid.

BACKGROUND OF THE INVENTION

Classic fluid delivery systems for supplying fluid to a machine assembly, in particular within the motor vehicle sector for supplying fluid to an engine or transmission, are usually based on forced-feed lubrication, in particular wet-sump lubrication, using at least one pump which delivers the fluid, in particular oil, to the locations to be lubricated and/or cooled. In classic wet-sump lubrication, the fluid which drains from the machine assembly is collected in a reservoir, which is arranged below the machine assembly, and pumped out of the reservoir by means of the pump and fed to the machine assembly again. In this way, a fluid circulation arises for lubricating and/or cooling a machine assembly, in which a fluid is delivered in the circulation.

Such fluid delivery systems usually comprise at least one filter module for filtering the fluid of particles and/or contaminants before it is fed to the machine assembly, i.e. the pump delivers the fluid firstly through an oil filter before it is fed to the machine assembly.

Such fluid delivery systems have on the one hand the disadvantage that such filter modules represent a high flow resistance and the pumps for delivering the fluid exhibit a high power requirement, due to the filter module, in order to reliably supply fluid to the machine assembly. In the motor vehicle sector in particular, this can for example result in increased fuel consumption and/or power consumption and/or a reduced range.

Said fluid delivery systems also have the disadvantage that they can for example suction air when the motor vehicle is in an extreme driving situation. Cornering and/or sharp acceleration or braking manoeuvres when the motor vehicle is at high speed can result in the centrifugal forces which arise pressing the fluid, in particular oil, away from the aspiration point within the reservoir, such that air is suctioned in addition to fluid, or only air is suctioned, at the aspiration point. This can result in an interruption to the supply of fluid to the machine assembly and, depending on the duration of the interruption and the temperature and/or state of the machine assembly, in particular the engine and/or transmission of the motor vehicle, can have fatal consequences. In the worst case scenario, this can result in damage to the engine and/or transmission of a motor vehicle.

Alternatives to classic wet-sump lubrication have therefore been developed which are intended to prevent air from being suctioned. The prior art discloses for example wet-sump lubrication in which the reservoir comprises so-called oil baffle blocks, in particular baffle plates or bulkhead plates, in order to prevent the fluid from being pressed away from the aspiration point at times of large centrifugal forces, in particular high transverse acceleration such as for example arises when cornering. It has also proven to be of value to embody the pump and/or the aspiration point at a very deep location within the reservoir which is for example embodied in the form of a funnel-shaped recess in the reservoir, such that even in extreme driving situations, enough fluid is as far as possible always present in the region of the aspiration point.

The disadvantage of such wet-sump lubrication is that it requires a lot of space, in particular in its vertical extent, due to the reservoir being embodied with a recess. This means that an engine with integrated wet-sump lubrication must for example be installed relatively high up within the motor vehicle in order to have sufficient space available for the reservoir. This leads to a high centre of gravity in the motor vehicle, which can have a negative effect on the handling of the motor vehicle.

So-called dry-sump lubrication has therefore been developed as an alternative to wet-sump lubrication. It is used in particular in high-performance engines and/or off-road or sports vehicles. In dry-sump lubrication, the fluid is aspirated by means of a pump from an oil sump, into which the fluid flows back after it has been supplied to the machine assembly, and fed to a separate oil container. The oil container in turn serves to supply the machine assembly, in that the fluid is aspirated from the oil container by means of another pump and fed to the machine assembly.

Dry-sump lubrication has the advantage that it reliably lubricates the machine assembly, since it is less susceptible to centrifugal forces, and oil is actively supplied to the aspiration point of the oil container. In addition, a large oil container can improve the cooling effect of the fluid, and a flat oil sump which is embodied below the machine assembly can reduce the overall height of the machine assembly, thus enabling the centre of gravity of the motor vehicle to be lowered. The latter is in particular advantageous for flat motor vehicles such as for example sports vehicles. In addition, the separately embodied oil container can be installed at any location, since the fluid drains from the machine assembly firstly into the oil sump and is actively delivered to the oil container.

While this type of lubrication is very reliable in terms of supplying fluid to the machine assembly, it is however susceptible to faults and is above all cost-intensive due to the large number of additional components. In addition to an additional pump, which delivers the fluid from the oil sump to the oil container, dry-sump lubrication also for example requires an additional oil container next to the oil sump for storing the fluid. Dry-sump lubrication also requires more space overall than classic wet-sump lubrication, in particular due to the separately embodied oil container.

SUMMARY IF THE INVENTION

An aspect of the invention is a fluid delivery system for supplying fluid to at least one machine assembly, which reliably prevents air from being suctioned, requires little space and is cost-effective.

The fluid delivery system for supplying fluid to at least one machine assembly, in particular an engine and/or transmission of a motor vehicle, comprises a housing which comprises a reservoir for storing the fluid. Where reference is made in the course of the application to the machine assembly, this can also encompass multiple machine assemblies, unless stated otherwise. The at least one machine assembly to be supplied can be an electric machine comprising a transmission and an electric motor. The transmission of the electric machine can for example form a first machine assembly to be supplied, and the electric motor can form a second machine assembly to be supplied.

The electric machine preferably serves to drive a motor vehicle and forms the main assembly of the motor vehicle. The transmission can be a reducing transmission which lowers the rotational speed of the electric motor. The transmission can comprise one or more gears and in particular two gears. The fluid can for example be formed by an oil. If the machine assembly to be supplied is an electric machine comprising a transmission and an electric motor, the transmission can form the main recipient of the fluid delivery system, and the electric motor, in particular the drive shaft, can form the secondary recipient.

The housing can comprise a first housing part, in particular a housing cup, and a second housing part, in particular a housing cover. The housing can comprise a first suction port and a second suction port. The fluid can for example drain and in particular be aspirated from the housing via the first suction port and the second suction port. The housing can also comprise a first pressure port and/or a second pressure port. Fluid can in particular be supplied to the housing via the first pressure port and/or the second pressure port. In preferred embodiments, the housing comprises a first pressure port and a second pressure port. Alternatively, the housing can comprise only one pressure port, in particular the second pressure port.

The fluid delivery system, in particular the housing, can also comprise a first return opening and/or a second return opening. Fluid can flow back from the machine assembly or assemblies to be supplied, into the housing and in particular the reservoir, via the first return opening and/or the second return opening. The first return opening and/or the second return opening can be able to be connected to the machine assembly or assemblies. The first return opening and the second return opening can be connected to the same machine assembly. Alternatively, the first return opening can be connected to a different machine assembly than the second return opening.

The first housing part and the second housing part can be joined directly to each other, i.e. the first housing part and the second housing part contact each other when joined, in particular in the region of the joins. Alternatively, the first housing part and the second housing part can be joined to each other indirectly, i.e. the first housing part and the second housing part are connected to each other, in particular in the region of the joins, via at least one other component, for example a gasket. The first and second housing parts can for example be separated by another component.

The first housing part and the second housing part can be joined to each other in a force fit and/or in a positive fit. The first housing part and the second housing part can for example be joined to each other by a screw connection, rivet connection or clinch connection. If the first housing part and the second housing part are joined to each other in a force fit and/or in a positive fit, a gasket can be formed between the first housing part and the second housing part which seals off the housing, in particular the reservoir, against the escape of fluid, wherein the gasket can be formed by a separate component or for example by a sealing compound.

The first and second housing parts can be joined to each other in a material fit. The first housing part and the second housing part can for example be joined to each other by gluing, welding or soldering. If the first housing part and the second housing part are joined to each other in a material fit, the first and second housing parts can be connected in a seal via the joining connection. The first housing part and the second housing part can be joined to each other in a material fit, such that the first housing part and the second housing part can form sealing points in the region of the joins. The first housing part and the second housing part can be joined to each other in a material fit, such that at least the reservoir embodied in the housing is sealed off circumferentially in the region of the joins.

The first housing part and the second housing part can be connected to each other in both a positive and/or force fit and a material fit. The first and second housing parts can then for example be welded or glued to each other and simultaneously connected to each other by for example a screw connection. The first and second housing parts can also be connected to each other in a positive fit by positioning pins, such that they are aligned with each other in their position, and joined to each other by a material-fit connection.

The housing, in particular the first housing part and/or the second housing part, can be manufactured in a reshaping or original-moulding method. The housing, in particular the first housing part and/or the second housing part, can be manufactured in an original-moulding method for example by casting, injection-moulding or sintering. The housing, in particular the first housing part and/or the second housing part, can alternatively be manufactured in a reshaping method, for example by deep-drawing. The housing, in particular the first housing part and/or the second housing part, can be mannitol from a plastic or a metal. The housing, in particular the first housing part and/or the second housing part, can for example be manufactured from aluminium or steel.

The reservoir for storing the fluid can be embodied within the housing. The reservoir can in particular be embodied, in particular enclosed, by the first housing part and/or the second housing part. The reservoir can for example be formed by a hollow space in the housing. The reservoir can comprise at least one aspiration point at which the fluid can be aspirated.

The reservoir can comprise a main sump and a secondary sump. If the reservoir comprises a main sump and a secondary sump, the aspiration point is for example embodied in the main sump. The main sump and the secondary sump can be fluidically connected to each other via a baffle plate, i.e. the fluid can flow from the main sump into the secondary sump and vice versa, irrespective of the baffle plate. For this purpose, the baffle plate can for example comprise at least one cavity which connects the main sump and the secondary sump to each other. Alternatively, or additionally, the baffle plate can be embodied such that the fluid can flow from the main sump into the secondary sump and vice versa, bypassing the baffle plate. The baffle plate can for example exhibit, at least in portions, a vertical extent which is smaller than the fluid level at said location when the fluid delivery system is in normal operation, such that it forms an overflow for the fluid, and/or the baffle plate can be embodied such that it is interrupted or shorter in the longitudinal direction than the extent of the reservoir at said location, such that the fluid can flow past the baffle plate, i.e. the baffle plate for example does not completely span the reservoir, in particular in its vertical and horizontal extent.

The fluid delivery system, in particular the housing, can comprise a first return opening. The first return opening can for example be connected to the machine assembly. The fluid flowing back from the machine assembly, in particular a portion of the fluid flowing back from the machine assembly, can flow back into the housing, in particular the reservoir, via the first return opening. The fluid can flow back from the machine assembly into the reservoir, in particular the main sump of the reservoir, via the first return opening.

The first return opening can be embodied in the form of a cavity in the housing. The first return opening can be embodied in the first housing part or the second housing part. A portion of the fluid flowing back from the machine assembly can flow back directly into the reservoir, in particular the main sump, via the first return opening. The first return opening can emerge into the reservoir, in particular the main sump, on the side of the opening which faces away from the assembly.

The fluid delivery system, in particular the housing, can comprise a second return opening. The second return opening can for example be connected to the same machine assembly as the first return opening. Alternatively, the second return opening can be connected to a different machine assembly. The fluid flowing back from a machine assembly can flow back into the housing via the second return opening. The fluid flowing back from the machine assembly can for example flow back into the housing, in particular at a distance from the reservoir, via the second return opening.

The second return opening can be embodied in the form of a cavity in the housing. The second return opening can be embodied in the first housing part or the second housing part. The second return opening can be connected to the reservoir, in particular the secondary sump, via an equalising conduit in or on the housing. Alternatively, or additionally, the second return opening can be connected to the reservoir, in particular the main sump, via a second pressure conduit. In particular, the second return opening does not emerge into the reservoir, in particular the main sump, on the side of the opening which faces away from the assembly.

The first return opening and/or the second return opening can comprise a screen 26. The screen 26 can be embodied on the side of the first and/or second return opening which faces the machine assembly or assemblies. In alternative embodiments, the first return opening and/or the second return opening can comprise a screen on the side which faces away from the assembly.

The first return opening and/or the second return opening can be connected, in particular fluidically, to the machine assembly or assemblies via a first return line and/or a second return line. The first return line and/or the second return line can connect the machine assembly or assemblies to the reservoir via the first return opening and/or the second return opening, i.e. the fluid can flow back from the machine assembly or assemblies to the reservoir via the first return line and/or the second return line. The first return line can for example connect one machine assembly, in particular a transmission, to the first return opening, and the second return line can connect the same or a different machine assembly, in particular an electric motor, to the second return opening.

The first return line and/or the second return line can each be formed by a conduit which extends from the machine assembly connected to the respective return line up to the first return opening and/or the second return opening. Alternatively, and in particular when the first return line and the second return line are connected to the same machine assembly, the first return line and the second return line can be formed by a common conduit which extends from the machine assembly up to the first return opening and/or the second return opening. The first return line and/or the second return line can be a closed conduit or for example an open conduit, for example within the assembly housing. In the case of an open conduit, the fluid can for example flow freely through the corresponding assembly housing towards the housing, in particular the reservoir. The housing can be embodied below the machine assembly or assemblies, such that the fluid can flow towards the housing due to the effect of gravity.

The fluid delivery system can comprise a first pump and a second pump. The first pump can preferably suction fluid from the reservoir and deliver it towards at least one machine assembly. The first pump is in particular a supply pump for supplying fluid to at least one machine assembly. The first pump can for example suction fluid from the reservoir, in particular the main sump, on its low-pressure side. In particular, the first pump can for example suction fluid from the reservoir via the aspiration point on its low-pressure side. The first pump preferably delivers fluid to the machine assembly on its high-pressure side.

The second pump is preferably arranged downstream of the first pump. The second pump can in particular suction fluid from the high-pressure side of the first pump. The second pump can in particular be arranged downstream of the at least one machine assembly. The second pump can for example suction fluid downstream of the at least one machine assembly. The second pump can for example suction fluid from the housing on its low-pressure side. The second pump can in particular suction fluid from the housing on its low-pressure side away from the reservoir. The second pump preferably delivers fluid to the reservoir, in particular the main sump of the reservoir, on its high-pressure side.

The first pump and the second pump can be driven via a common drive. Alternatively, the first pump can comprise its own drive and the second pump can comprise its own drive. The drive of the first pump and/or the second pump can be formed by an electric motor.

The fluid delivery system can also comprise a pump module for delivering the fluid. The first pump and the second pump can be part of the pump module. The pump module can aspirate the fluid from the aspiration point of the reservoir and feed it to the machine assembly. The fluid delivery system also comprises a drive for driving the pump module. The drive can for example comprise an electric motor. In alternative embodiments, the drive can comprise the machine assembly to which fluid is to be supplied.

The pump module can comprise a first inlet, a second inlet, a first outlet and a second outlet. The first inlet and/or the second inlet are preferably embodied on a low-pressure side of the pump module. The first outlet and/or the second outlet can be embodied on a high-pressure side of the pump module.

The first inlet can be connected, in particular directly, to the first suction port of the housing. The pump module can for example suction fluid from the housing, in particular the reservoir, via the first suction port and the first inlet. The pump module can in particular suction fluid from the main sump via the first inlet and deliver it to the machine assembly via the first outlet. The second inlet is for example connected, in particular directly, to the second suction port of the housing. The pump module can for example suction fluid from the housing via the second inlet and in particular via the second suction port.

The first outlet can be connected, in particular directly, to the first pressure port of the housing. The second outlet is for example connected, in particular directly, to the second pressure port of the housing. The pump module can feed fluid to the housing, in particular a first pressure conduit in the housing, via the first pressure port and the first outlet. Alternatively, the first outlet can also be connected to the machine assembly via a pressure conduit, bypassing the housing. The pump module can feed fluid to the housing, in particular the reservoir, via the second pressure port and the second outlet. By embodying the first pressure conduit within the housing, the fluid delivery system can be embodied in a particularly space-saving way.

The pump module can for example suction fluid from the housing via the second inlet and discharge fluid to the reservoir, in particular the main sump, via the second outlet. The pump module can for example suction fluid from the reservoir, in particular the main sump, via the first inlet and discharge the fluid to the machine assembly via the first outlet.

The pump module can comprise the first pump and the second pump. Alternatively, the pump module can comprise a multi-circuit pump, in particular a dual-circuit pump, comprising at least a first working flux and a second working flux. The pump module can for example comprise a dual-stroke vane pump.

The first pump can for example suction the fluid via the first inlet. The low-pressure side of the first pump can in particular be fluidically connected to the first inlet of the pump housing. The first pump can discharge the fluid via the first outlet. The first pump can in particular be fluidically connected on its high-pressure side to the first outlet of the pump module.

The second pump can for example suction the fluid via the second inlet. The second pump can in particular be fluidically connected on its low-pressure side to the second inlet of the pump module. The second pump can discharge the fluid via the second outlet. The second pump can in particular be fluidically connected on its high-pressure side to the second outlet.

The first pump and/or the second pump can be arranged in a pump housing. The first pump and the second pump can in particular be arranged in a common pump housing. The pump housing can simultaneously form the housing of the pump module. The pump housing can in particular be the housing of the pump module.

The pump housing can be embodied by the housing. The pump housing can be a pump housing which is separate from the housing. The pump housing can be connected, in particular screwed, to the housing. The pump housing can for example be inserted into an accommodating well of the housing or connected to the housing on an outer side of the housing. The pump housing can also be embodied at a distance from the housing, such that the housing and the pump housing are for example connected to each other only via fluid conduits.

The drive for the pump module, in particular for the first pump and/or the second pump, can also be embodied within the pump housing. The drive can drive the first pump and/or the second pump. The drive can preferably drive the first pump and the second pump. The pump module and the drive can be jointly embodied within the separately formed pump housing. The pump housing can be connected, in particular screwed, to the housing.

The first pump and/or the second pump can be formed by a rotary pump. The first pump and/or the second pump can in particular be formed by an internal gear pump. In alternative embodiments, the first pump and/or the second pump can also be formed by a vane pump, pendulum-slider pump or other rotary pump.

The first pump and the second pump can exhibit the same design: for example, the first pump and the second pump can both be formed by an internal gear pump, a vane pump or a pendulum-slider pump. In alternative embodiments, the first pump and the second pump can exhibit different designs: for example, the first pump can be formed by an internal gear pump and the second pump can be formed by a vane pump. In alternative embodiments, it is also possible for the first pump to be formed by a vane pump and the second pump to be formed by an internal gear pump.

The first pump and the second pump can comprise the same drive. A rotor of the first pump and a rotor of the second pump can in particular comprise a common drive shaft. The rotor of the first pump can in particular be arranged on the same drive shaft as the rotor of the second pump. The drive shaft can be driven by the drive or can be part of the drive.

The pump module can comprise a first working flux which extends from the first inlet up to the first outlet. The pump module can also comprise a second working flux which extends from the second inlet up to the second outlet. The first working flux and the second working flux can be fluidically separated from each other. The first pump is preferably embodied within the first working flux. In particular, the working circulation of the first pump preferably forms the first working flux of the pump module. The second pump is preferably embodied within the second working flux. In particular, the working circulation of the second pump preferably forms the second working flux of the pump module.

The pump module can be embodied as a multi-flux pump module, in particular a multi-circuit pump module. The pump module can in particular be embodied as a dual-flux pump module, in particular a dual-circuit pump module. In multi-flux embodiments, the first outlet of the pump module can be an outlet common to the multiple working fluxes and/or the first inlet can be an inlet common to the multiple working fluxes. In a multi-circuit embodiment, by contrast, the individual working fluxes are sealed off from each other, i.e. each working flux has its own inlet and its own outlet.

The pump module can be embodied as a multi-circuit pump module, in particular a dual-circuit pump module, comprising a first working flux and a second working flux. Preferably, the first working flux is fluidically sealed off from the second working flux. The first inlet can form the inlet of the first working flux, and the second inlet can form the inlet of the second working flux. The first outlet can form the outlet for the first working flux, and the second outlet can form the outlet for the second working flux.

The first working flux preferably comprises a first low-pressure side and a first high-pressure side. The first low-pressure side can extend from the reservoir up to and into the delivery chamber of the first pump. The first high-pressure side can extend from the delivery chamber of the first pump up to and into the reservoir. The second working flux can comprise a second low-pressure side and a second high-pressure side. The second low-pressure side can extend from the housing up to and into the delivery chamber of the second pump. The second high-pressure side can extend from the delivery chamber of the second pump up to and into the reservoir. The second low-pressure side can in particular be embodied downstream of the first high-pressure side, i.e. the second working flux can suction fluid on its low-pressure side from the high-pressure side of the first working flux.

The first working flux can for example suction fluid from the reservoir, in particular the main sump, on the first low-pressure side. In particular, the first working flux can for example suction fluid from the reservoir via the aspiration point on the first low-pressure side. The first working flux preferably delivers fluid to the machine assembly on its first high-pressure side.

The second working flux can for example suction fluid from the housing on the second low-pressure side. In particular, the second working flux preferably suctions fluid from the housing on the second low-pressure side away from the reservoir. The second working flux preferably delivers fluid to the reservoir, in particular the main sump of the reservoir, on the second high-pressure side.

The first pump preferably serves to supply fluid to the machine assembly. The first pump can in particular suction fluid from the reservoir, in particular the main sump, and deliver it towards the machine assembly. The second pump can be embodied as a bilge pump. The second pump can in particular deliver fluid into the reservoir, in particular the main sump. The second pump can deliver fluid situated within the housing and outside the main sump and/or secondary sump into the reservoir, in particular the main sump. The second pump preferably delivers fluid situated within the housing and outside the reservoir into the reservoir, in particular the main sump. The second pump can suction fluid which flows from the machine assembly into the housing via the second return opening.

The fluid delivery system can comprise a supply flow and a sub-flow. The sub-flow delivers for example a portion of the fluid of the supply flow which flows back to the housing. The supply flow, in particular the portion of the supply flow which is not delivered by the sub-flow, and the sub-flow can converge in the reservoir, in particular the main sump. The fluid of the supply flow and the fluid of the sub-flow are preferably intermixed in the reservoir, in particular the main sump. The supply flow is preferably formed by the fluid circulation of the first working flux. The sub-flow is preferably formed by the fluid circulation of the second working flux. Preferably, the first pump delivers the fluid of the supply flow and/or the second pump delivers the fluid of the sub-flow.

The supply flow is understood to mean in particular the fluid circulation, in particular the volume flow, which serves to supply the at least one machine assembly. The supply flow is in particular understood to mean the fluid circulation for supplying fluid from the reservoir to the at least one machine assembly, i.e. the supply flow is in particular formed by the fluid circulation which flows from the reservoir, via the pump module and the machine assembly, up to and into the reservoir. The first pump preferably serves to deliver the fluid of the supply flow, i.e. the fluid circulation of the first pump preferably forms the supply flow.

Downstream of the reservoir, the supply flow can be divided into at least two supply sub-flows for supplying fluid to one or more machine assemblies. The supply flow can in particular be divided downstream of the reservoir into a first supply sub-flow and a second supply sub-flow. The supply flow can in particular be divided upstream of the at least one machine assembly into at least two supply sub-flows. The first supply sub-flow can for example supply fluid to one machine assembly, and the second supply sub-flow can supply fluid to the same or a different machine assembly. If the machine assembly is for example an electric machine, the first supply sub-flow can supply fluid to the transmission, and the second supply sub-flow can supply fluid to the electric motor, in particular the drive shaft.

The two supply sub-flows can flow back from the machine assembly into the housing, in particular the reservoir, at different locations. In particular, the first supply sub-flow can flow back into the housing via the first return line, and the second supply sub-flow can flow back into the housing via the second return line. In alternative embodiments, the first supply sub-flow and the second supply sub-flow can flow back into the housing via a common return line. The supply sub-flows can in particular recombine into one supply flow before they flow back into the housing, in particular the reservoir, and flow back into the housing, in particular the reservoir, via the first return opening and/or the second return opening.

The supply sub-flows can differ in size, i.e. the volume flow of the individual supply sub-flows can differ. The first supply sub-flow can in particular be larger than the second supply sub-flow. In alternative embodiments, the supply sub-flows can be of equal size. The volume flow of the individual supply sub-flows can in particular each be of equal size.

The sub-flow is preferably understood to mean the fluid circulation, in particular the volume flow, which serves to circulate the fluid. The fluid of the sub-flow is in particular delivered from the housing into the reservoir, in particular the main sump, from a location away from the reservoir, i.e. the sub-flow is preferably formed by the fluid circulation which flows from the housing into the reservoir via the pump module, in particular away from the reservoir. Via the sub-flow, the fluid can in particular be aspirated from the housing, in particular from a location away from the reservoir, and fed to the reservoir. The sub-flow can in particular also be referred to as a bilge flow. The second pump preferably serves to deliver the fluid of the sub-flow, i.e. the fluid circulation of the second pump preferably forms the sub-flow.

The sub-flow can in particular suction fluid of the supply flow, in particular the fluid of the second supply sub-flow and/or the first supply sub-flow, and deliver it towards the reservoir. The sub-flow in particular suctions fluid of the supply flow downstream of the machine assembly. In preferred embodiments, the sub-flow suctions fluid of the second supply sub-flow after the fluid has flowed back into the housing and in particular after the second supply sub-flow has flowed back into the housing through the second return opening.

The volume flow of the sub-flow can be smaller than the volume flow of the supply flow. The sub-flow can be equal in size to the second supply sub-flow. If the supply flow is divided into a first supply sub-flow and a second supply sub-flow and if the two supply sub-flows are of equal size, the sub-flow is for example half as large as the supply flow. The volume flow of the sub-flow is in particular less than half the volume flow of the supply flow, i.e. the amount of fluid delivered in the sub-flow can be smaller than the amount of fluid in the supply flow and can in particular correspond to less than half the amount of fluid in the supply flow, i.e. the second pump can in particular deliver less fluid than the first pump. The second pump can in particular deliver less than 50% of the fluid of the first pump. Conversely, the volume flow of the first pump can be twice as large as the volume flow of the second pump.

The first inlet of the pump module can be fluidically connected to the reservoir via a first suction conduit. The pump module can in particular be connected to the main sump of the reservoir via the first suction conduit. The upstream end of the first suction conduit can emerge into the reservoir, in particular the main sump, via the aspiration point.

The first suction conduit can in particular fluidically connect the first inlet of the pump module to the reservoir, in particular the main sump, for example via the first suction port. The upstream end of the first suction conduit preferably emerges into the reservoir, in particular the main sump. The first outlet can be connected to the at least one machine assembly via a first pressure conduit. The supply flow can in particular flow from the reservoir to the at least one machine assembly via the first suction conduit and the first pressure conduit.

The first pressure conduit can be formed in or on the housing. The first pressure conduit can in particular be formed completely or partially between the first housing part and the second housing part. The first pressure conduit can be formed completely or partially by the first housing part and/or the second housing part. In preferred embodiments, the first pressure conduit is embodied completely or partially by the first housing part and the second housing part. The first pressure conduit can in particular comprise multiple portions. The pressure conduit can be at least partially formed by the housing. A portion of the pressure conduit can for example be formed completely or partially by the housing.

The first pressure conduit preferably connects the first outlet of the pump module to the at least one machine assembly. The pump module can preferably aspirate fluid from the reservoir via the first inlet and the first suction conduit and feed it to the machine assembly via the first outlet and the first pressure conduit. The fluid can preferably flow to the location to be supplied in the machine assembly via the first pressure conduit.

The first pressure conduit can in particular be divided downstream of the first outlet into a first supply conduit and a second supply conduit. The first supply conduit and the second supply conduit can be regarded as portions of the first pressure conduit. The first supply conduit can for example be connected to a first machine assembly. The second supply conduit can for example be connected to a second machine assembly. The supply flow can in particular be divided between the first supply conduit and the second supply conduit.

Preferably, the second inlet is fluidically connected to the housing via a second suction conduit. The second suction conduit can extend from the second inlet up to its upstream end via the second suction port. Preferably, the second suction conduit fluidically connects the second inlet of the pump module to the housing. The second working flux can in particular suction fluid from the housing via the second suction conduit on the second low-pressure side.

The second outlet can be fluidically connected to the reservoir via a second pressure conduit. The downstream end of the second pressure conduit can in particular emerge into the main sump of the reservoir. The second pressure conduit preferably connects the second outlet of the pump module to the reservoir. The second pressure conduit can extend from the second outlet up to and into the reservoir via the second pressure port. The second working flux can in particular discharge fluid to the reservoir, in particular the main sump, via the second pressure conduit on the second high-pressure side.

The upstream end of the second suction conduit can emerge into the housing at a distance from the downstream end of the second pressure conduit. The upstream end of the second suction conduit does not in particular emerge into the reservoir. The upstream end of the second suction conduit preferably emerges into the housing away from the main sump and/or the secondary sump. The sub-flow can for example flow through the second suction conduit and the second pressure conduit.

In preferred embodiments, the upstream end of the second suction conduit emerges into the housing adjacently to the second return opening, in particular downstream of the second return opening. The upstream end of the second suction conduit preferably emerges into the housing on the side of the second return opening which faces away from the at least one machine assembly. The upstream end of the second suction conduit is in particular embodied on the side of the screen of the second return opening which faces away from the at least one machine assembly.

In alternative embodiments, the upstream end of the second suction conduit can emerge into the first return line and/or the second return line adjacently to the second return opening, in particular upstream of the second return opening. The upstream end of the second suction conduit can emerge into the first return line and/or the second return line on the side of the second return opening which faces the at least one machine assembly. The upstream end of the second suction conduit can in particular be embodied on the side of the screen of the second return opening which faces the at least one machine assembly.

In preferred embodiments, the fluid flowing back from the machine assembly via the second return opening can flow into the reservoir, in particular the main sump, via the second suction conduit, the pump module, in particular the second pump, and the second pressure conduit. The fluid flowing back from the machine assembly via the second return opening can in particular be delivered/pumped into the reservoir, in particular the main sump, via the second suction conduit and the second pressure conduit through the pump module, in particular the second pump. In this way, fluid is actively supplied to the reservoir, in particular the main sump, by the pump module, in particular the second pump.

If the machine assembly is the engine and/or transmission of a motor vehicle, this has the advantage that fluid is supplied to the main sump, in particular the aspiration point in the main sump, irrespective of the driving situation of the vehicle. If, for example, a driving situation arises in which the fluid is pressed away from the aspiration point, for example into the secondary sump, the second pump ensures that fluid continues to be supplied to the aspiration point by circulating the fluid within the housing. In this way, there is no interruption to the supply of fluid to the machine assembly.

The first suction conduit can be a conduit which is completely or partially formed separately from the first housing part and the second housing part. The upstream end of the first suction conduit can emerge into the reservoir, in particular the main sump, and can extend in the downstream direction up to the first inlet via the first suction port of the housing. The first suction port of the housing can be connected, in particular fluidically, directly or indirectly, for example via a tube portion, to the first inlet of the pump module.

The first suction conduit can be formed not or largely not by the first housing part and/or the second housing part. The first suction conduit can in particular be formed completely or partially by a tube portion which is formed separately from the first housing part and the second housing part. The first suction conduit can be formed completely or at least partially by a separate tube portion which is arranged between the first housing part and the second housing part.

The first suction conduit can be formed completely or partially by a tube portion which extends within the housing, in particular the reservoir.

The upstream end of the tube portion can emerge into the reservoir. The upstream end of the tube portion can in particular embody the aspiration point. If the first suction conduit is formed completely by the tube portion, the downstream end of the tube portion can be connected directly to the first inlet of the pump module. If the tube portion is connected directly to the first inlet of the pump module, the tube portion can protrude through the suction port of the housing and/or terminate flush with the suction port. The suction port can be formed by an opening in the housing through which the tube portion protrudes or which the tube portion adjoins.

If the first suction conduit is embodied partially by a tube portion which is separate from the first housing part and the second housing part, the downstream end of the tube portion can adjoin the housing, in particular the suction port. The suction conduit can be formed partially by a tube portion and partially by a conduit in the housing. If the first suction conduit is formed partially by a channel in the housing, the tube portion can adjoin the channel. If the first suction conduit is formed partially by a channel in the housing and partially by a tube portion, the tube portion can be at least twice, in particular at least three times, as long as the channel in the housing. At least half and in particular at least two thirds of the first suction conduit can be formed by the tube portion.

The tube portion can be embodied to be rigid or flexible. The tube portion can for example be formed by a flexible tube or a rigid pipe. The cross-section transverse to the flow direction of the tube portion can be identical in shape and size over the overall length or can vary in the longitudinal direction. The cross-section transverse to the flow direction of the tube portion can exhibit any shape; the cross-section transverse to the flow direction of the tube portion can in particular be round, in particular circular, oval or angular. The tube portion can be made from the same material as the housing or from a different material to the housing.

The fluid delivery system can comprise a filter module comprising at least one filter. The filter module can filter particles from the fluid which are for example damaging to an engine and/or transmission of a motor vehicle. The filter module can comprise a bypass valve. The bypass valve can exhibit a first valve position and a second valve position. In the first valve position, the bypass valve preferably does not allow any fluid to flow through the bypass valve. In the second valve position, the bypass valve can allow fluid to flow through the bypass valve, in particular bypassing the filter. The bypass valve preferably assumes the second valve position when the fluid is viscous. If the fluid delivery system is for example a fluid delivery system for supplying oil to an engine, the bypass valve assumes the second valve position when for example the engine is started.

The filter module can be embodied separately from the pump housing and/or the housing. The filter module can be connected, in particular screwed, to the pump housing. The filter module, in particular the filter, can be embodied in or on the pump housing. The pump module and the filter module can preferably together form a pump filter module. The filter module can in particular be embodied on the side of the first pump and/or second pump of the pump module which faces away from the drive. The filter module can be an oil filter, in particular an oil filter of a motor vehicle. The filter module can be a deep-bed filter.

The filter module can be designed to trap 20% of the particles larger than 6 μm, i.e. the filter module can exhibit a separation efficiency of 20% for particles larger than 6 μm. The filter module can in particular be designed to trap 65% of the particles larger than 14 μm, i.e. the filter module can exhibit a separation efficiency of 65% for particles larger than 14 μm. The filter module is preferably the main filter of the fluid delivery system.

The filter module can be embodied on the high-pressure side or the low-pressure side of the first pump. The filter module can in particular be embodied upstream or downstream of the first working flux. The filter module can be embodied downstream of the first working flux, in particular on the first high-pressure side. The filter module can in particular be embodied downstream of the first outlet of the pump module. The filter module can be embodied within the first pressure conduit and/or fluid is supplied to the filter module through the first pressure conduit. The fluid can in particular be delivered through the filter module by the first pump.

Alternatively, the filter module can be embodied upstream of the first working flux, in particular on the first low-pressure side. The filter module can in particular be embodied upstream of the first inlet of the pump module. The filter module can filter the fluid of the supply flow. The filter module can in particular filter the fluid upstream of the machine assembly. In this way, the machine assembly can be protected from wear caused by dirt particles.

In alternative embodiments, the filter module can be embodied downstream of the machine assembly; the filter module can in particular filter the fluid of the supply flow downstream of the machine assembly. In this way, it is for example possible to filter fluid contaminated by the machine assembly, before it flows back into the reservoir.

The filter module can in particular be embodied downstream or upstream of the machine assembly and filter the fluid of the supply flow. If the supply flow is divided into supply sub-flows (for example into a first supply sub-flow and a second supply sub-flow) downstream of the reservoir, the filter module can filter the fluid of the supply flow before it is divided. If the supply flow is divided into supply sub-flows (for example into a first supply sub-flow and a second supply sub-flow) downstream of the reservoir, the filter module can alternatively filter the fluid of a supply sub-flow. If the supply flow is divided into supply sub-flows (for example into a first supply sub-flow and a second supply sub-flow) downstream of the reservoir, the filter module can for example filter the fluid of the first supply sub-flow or the second supply sub-flow. The filter module can in particular filter the fluid of the first supply sub-flow and/or the second supply sub-flow via the sub-flow, before the fluid flows back into the reservoir.

The filter module can be embodied on the high-pressure side or the low-pressure side of the second pump. The filter module can then for example be embodied upstream or downstream of the second pump, in particular the second working flux. The filter module can in particular be embodied downstream of the second working flux, in particular on the second high-pressure side. Alternatively, the filter module can be embodied upstream of the second working flux, in particular on the second low-pressure side. The second working flux preferably delivers the fluid of the sub-flow. The fluid of the sub-flow can correspond completely or partially to the fluid of the second or first supply sub-flow, before it flows back into the reservoir. Alternatively, the fluid of the sub-flow can correspond to a portion of the fluid of the first supply sub-flow and the second supply sub-flow. The fluid can in particular be delivered through the filter module by the second pump.

The filter module can for example filter the fluid of the sub-flow. If the filter module filters the fluid of the sub-flow, the filter module is preferably embodied upstream of the second pump. Since the fluid of the supply flow, in particular the first supply sub-flow, and the fluid of the sub-flow, in particular the fluid of the second supply sub-flow, converge and/or are intermixed with each other in the reservoir, in particular the main sump, the fluid of the fluid delivery system as a whole is filtered over time.

If the supply flow is divided into supply sub-flows downstream of the reservoir and the filter module filters the fluid of the sub-flow, then no filter module or an auxiliary filter module can be embodied in the supply flow, upstream of where the supply flow is divided. If an auxiliary filter module is embodied upstream of where the supply flow is divided, then the auxiliary filter module can in particular separate larger and/or fewer particles from the fluid than the filter module of the sub-flow, i.e. the separation efficiency of the auxiliary filter module is preferably poorer than the separation efficiency of the filter module in the sub-flow. The auxiliary filter module can in particular be designed to trap less than 20% of the particles larger than 6 μm. The auxiliary filter module can in particular be designed to trap less than 65% of the particles larger than 14 μm.

Arranging the filter module in the sub-flow, in particular the second suction conduit, has the advantage that the second pump, which in particular delivers the fluid of the sub-flow, delivers the fluid through the filter module, in particular the filter. In this way, the drop in pressure in the supply flow can be reduced. This has the advantage that the first pump does not have to apply as much power. In this way, power can be saved in the fluid delivery system as a whole.

If the filter module is embodied in the sub-flow, a bypass valve can for example be omitted. The bypass valve serves to ensure that fluid is supplied to the machine assembly even if the filter module is for example blocked. By arranging the filter module in the sub-flow, the supply flow ensures that fluid is supplied to the machine assembly. By omitting the bypass valve or otherwise ensuring the supply of fluid, the fluid delivery system can for example be manufactured more cost-effectively.

The fluid delivery system can comprise at least one heat exchanger. The heat exchanger can be embodied in addition to or as an alternative to the filter module. The heat exchanger can be embodied separately from the pump housing and/or housing. The heat exchanger can be embodied on or in the housing. Alternatively, the heat exchanger can be embodied on or in the pump housing. The heat exchanger can be connected, in particular screwed, to the housing. The heat exchanger and the housing can preferably together form a cooling trough module.

The heat exchanger can be fluidically connected to the reservoir. The heat exchanger can in particular be fluidically connected to the main sump and/or the secondary sump. In preferred embodiments, the heat exchanger is fluidically connected to the main sump. In the heat exchanger, thermal energy is transferred between the fluid provided for supplying the machine assembly and the fluid of the heat exchanger which is in particular a coolant. The heat exchanger can serve to cool the fluid for supplying the machine assembly, in particular oil for cooling and/or lubricating the machine assembly.

The heat exchanger can be embodied on the high-pressure side or the low-pressure side of the first pump. The heat exchanger can in particular be embodied upstream or downstream of the first working flux. The heat exchanger can be embodied downstream of the first working flux, in particular on the first high-pressure side. The heat exchanger can in particular be embodied downstream of the first outlet of the pump module.

Alternatively, the heat exchanger can be embodied upstream of the first working flux, in particular on the first low-pressure side. The heat exchanger can in particular be embodied upstream of the first inlet of the pump module. The heat exchanger can cool the fluid of the supply flow. The heat exchanger can in particular cool the fluid upstream of the machine assembly. In this way, the machine assembly can for example be cooled.

In alternative embodiments, the heat exchanger can be embodied upstream or downstream of the second working flux. The heat exchanger can in particular be embodied downstream of the second working flux, in particular on the second high-pressure side. Alternatively, the heat exchanger can be embodied upstream of the second working flux, in particular on the second low-pressure side. The heat exchanger can cool the fluid of the sub-flow. Since the fluid of the supply flow, in particular the fluid of the first supply sub-flow, and the fluid of the sub-flow, in particular the fluid of the second supply sub-flow, converge and/or are intermixed with each other in the reservoir, in particular the main sump, the fluid of the fluid delivery system as a whole is cooled over time.

If the fluid delivery system also comprises a filter module in addition to a heat exchanger, then both the filter module and the heat exchanger can be embodied in the supply flow or in the sub-flow. The heat exchanger and/or the filter module can in particular be embodied in the supply flow. The heat exchanger and/or the filter module can also be embodied in the sub-flow.

In one embodiment, the heat exchanger and the filter module can be embodied in the supply flow, wherein the filter module and/or the heat exchanger can be embodied downstream of the pump module, in particular the first pump. The filter module and/or the heat exchanger can also be embodied upstream of the pump module, in particular the first pump. One of the filter module and the heat exchanger can also be embodied upstream of the pump module, in particular the first pump, while the other is embodied downstream of the pump module, in particular the first pump. If the heat exchanger and the filter module are both embodied in the same flow, the filter module can be embodied upstream of the heat exchanger. Alternatively, the heat exchanger can be embodied upstream of the filter module.

In an alternative embodiment, the heat exchanger and the filter module can be embodied in the sub-flow. The filter module and/or the heat exchanger can be embodied downstream of the pump module, in particular the second pump. The filter module and/or the heat exchanger can also be embodied upstream of the pump module, in particular the second pump. The filter module is preferably embodied upstream of the heat exchanger.

Alternatively, the heat exchanger can be embodied upstream of the filter module. One of the filter module and the heat exchanger can also be embodied upstream of the pump module, in particular the second pump, while the other is embodied downstream of the pump module, in particular the second pump.

In another embodiment, one of the heat exchanger and the filter module can be embodied in the sub-flow, while the other is embodied in the supply flow. The heat exchanger and/or the filter module can be embodied upstream or downstream of the first pump and/or second pump. The filter module can in particular be embodied in the sub-flow downstream or upstream of the second pump, while the heat exchanger can be embodied in the supply flow downstream or upstream of the first pump. Alternatively, the filter module can be embodied in the supply flow downstream or upstream of the first pump, while the heat exchanger can be embodied in the sub-flow downstream or upstream of the first pump.

BRIEF DESCRIPTION OF THE DRAWINGS

The invention shall be described below on the basis of example embodiments. The features disclosed in the example embodiments advantageously develop the subject-matter of the claims and the embodiments described above. The figures show:

DETAILED DESCRIPTION OF THE PREFERRED EMBODIMENTS

Figure 1:
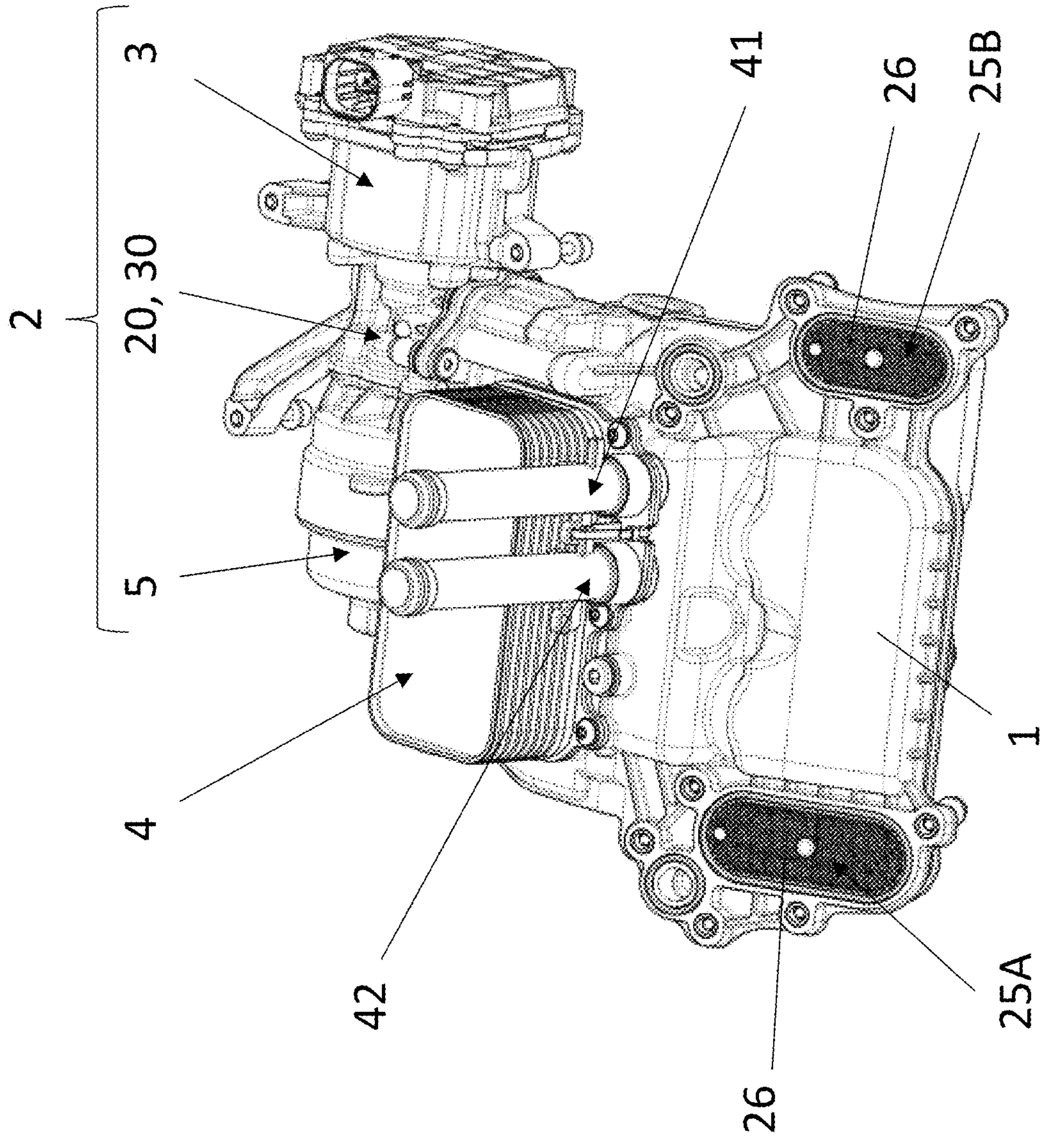
FIG. 1 an isometric view of a fluid delivery system.

FIG. 1 shows an isometric view of a fluid delivery system for supplying fluid to at least one machine assembly A. The at least one machine assembly A, which is not shown, can be an engine and/or transmission of a motor vehicle. The machine assembly A can in particular be an electric machine of a motor vehicle, which comprises an electric motor for driving the motor vehicle and a transmission for lowering the rotational speed of the electric motor. The fluid delivery system can be a fluid delivery system for supplying fluid, in particular oil for lubricating and/or cooling, to an engine and/or transmission of a motor vehicle.

The fluid delivery system according to FIG. 1 comprises a pump module 20, 30, a drive 3, a filter module 5 and a heat exchanger 4. The drive 3, the filter module 5 and the heat exchanger 4 are arranged by way of example and can be arranged elsewhere in the fluid delivery system or completely omitted. As can be seen from the terminals in FIG. 1, the drive 3 is preferably formed by an electric motor. The drive 3, the pump module 20, 30 and the filter module 5 together form a pump filter module. The heat exchanger 4 and the housing 1 together form a cooling trough module. The pump filter module and the cooling trough module can each form a unit.

Figure 2:
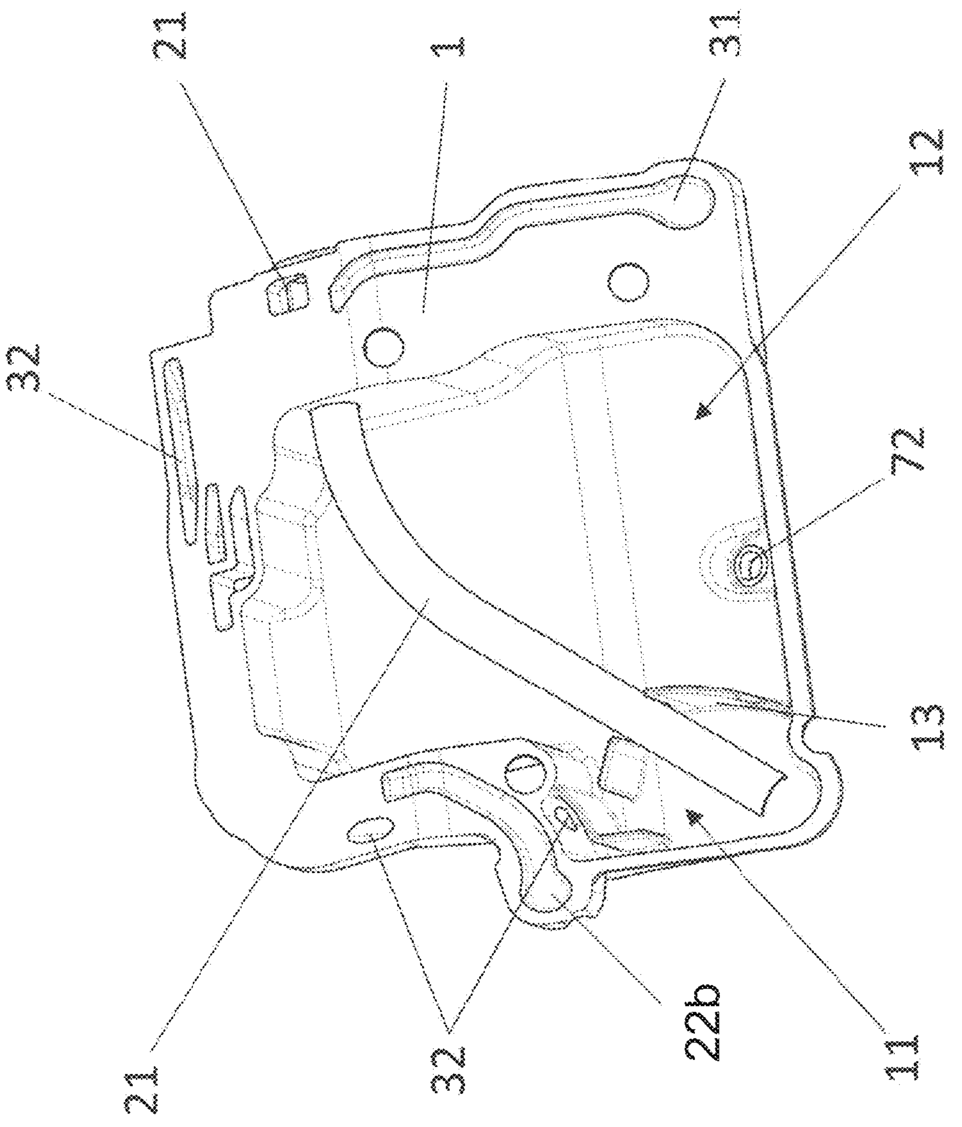
FIG. 2 an isometric view of a first housing part.
Figure 3:
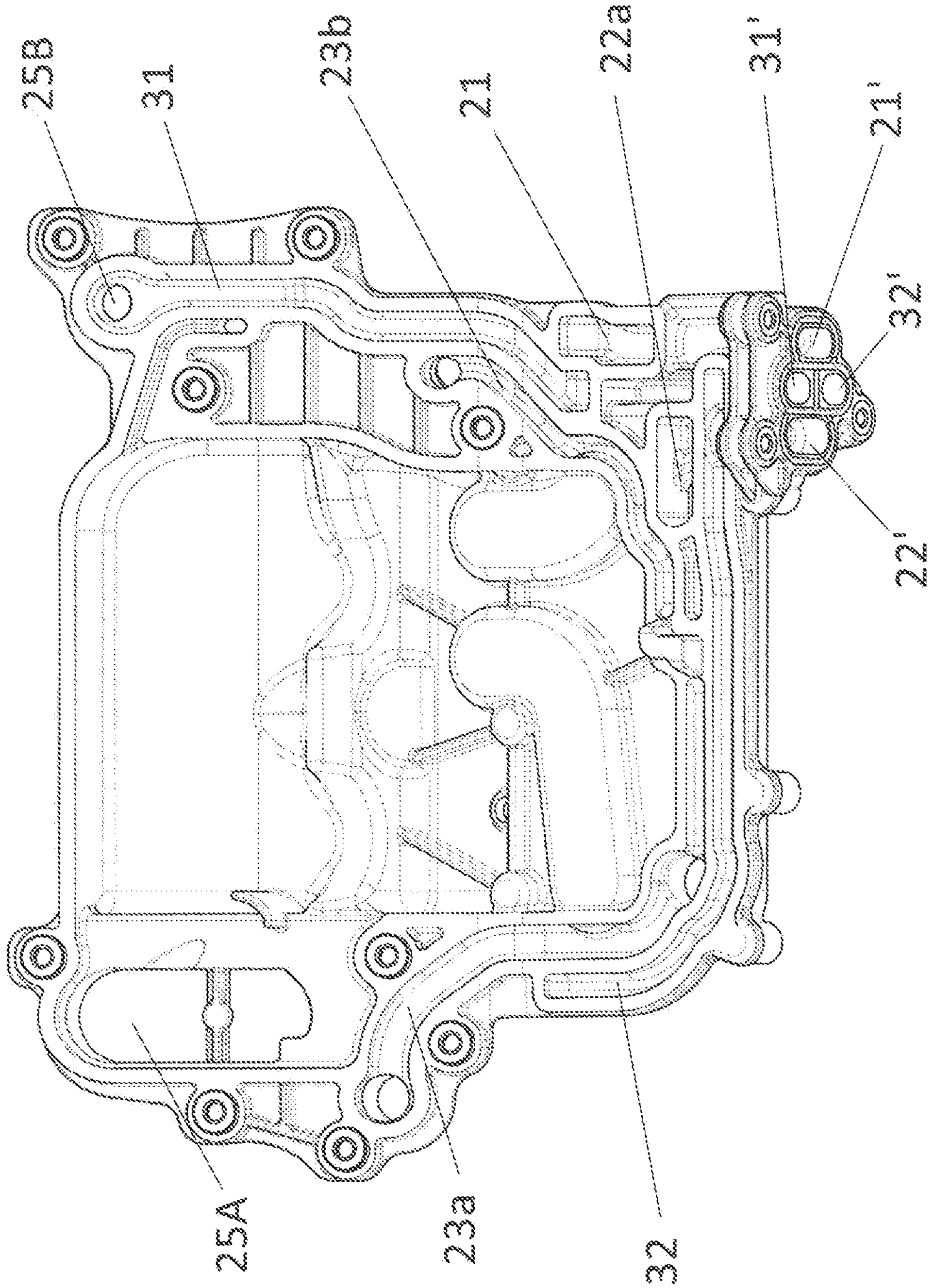
FIG. 3 an isometric view of a second housing part.

The fluid delivery system according to FIG. 1 comprises a housing 1 which comprises a reservoir 11, 12 for storing the fluid. The housing comprises a first housing part, in particular a housing cup as shown in FIG. 2, and a second housing part, in particular a housing cover as shown in FIG. 3. The second housing part comprises a first return opening 25A and a second return opening 25B. The first return opening 25A and the second return opening 25B are connected to the machine assembly A to be supplied. In particular, the first return opening 25A can be connected to one machine assembly A via a first return line 25*a*, and the second return opening 25B can be connected to another machine assembly A via a second return line 25*b*.

The fluid can flow back from the corresponding machine assembly A into the housing 1 via the first return opening 25A and the second return opening 25B. The fluid can flow back from the machine assembly A, in particular the transmission of an electric machine, into the reservoir 11, 12 via the first return opening 25A. The fluid can flow back from the machine assembly A, in particular a drive of an electric machine, into the housing 1 via the second return opening 25B. The first return opening 25A and/or the second return opening 25B can alternatively also be embodied in the first housing part.

The pump module 20, 30 comprises a first pump 20 (not shown in more detail) and a second pump 30 (not shown in more detail). The first pump 20 and the second pump 30 are arranged in a common pump housing 2. The first pump 20 and/or the second pump 30 is/are preferably a rotary pump, in particular an internal gear pump. An aspect of the invention is not however limited to the design of the pump and can for example also be embodied with vane pumps or the like. The first pump 20 and the second pump 30 can also be formed by different pumps.

In the present example embodiment of FIG. 1, the heat exchanger 4 is embodied in addition to the filter module 5. The heat exchanger 4 is embodied separately from the pump housing 2 and the housing 1. The heat exchanger 4 is embodied on the housing 1 and connected, in particular screwed, to the housing 1. The heat exchanger 4 comprises a first coolant conduit 41, via which the coolant can flow into the heat exchanger 4, and a second coolant conduit 42 via which the coolant can flow out of the heat exchanger 4. In alternative embodiments, the heat exchanger 4 can also be embodied as an air cooler.

The filter module 5 is connected to the pump housing 2, and/or the housing of the filter module 5 and the housing of the pump module 20, 30 form the pump housing 2, i.e. the pump housing 2 can be formed from multiple housing parts, wherein one housing part can be formed by the housing of the filter module 5. The filter module 5 comprises a filter (not shown in more detail) which filters the fluid as it flows through it.

In the example embodiment of FIG. 1, not only the filter module 5 but also the drive 3 is connected to the pump housing 2, and/or the housing of the drive 3 and the housing of the pump module 20, 30 together with the housing of the filter module 5 form the pump housing 2. The drive 3 is arranged on the side of the pump module 20, 30 which faces away from the filter module 5, i.e. the pump module 20, 30 is embodied between the filter module 5 and the drive 3.

FIGS. 2 and 3 show the housing 1 of FIG. 1, in particular the first housing part and the second housing part, in an isometric view. The reservoir 11, 12 can be formed, in particular enclosed, by the first housing part and the second housing part. The first housing part is embodied in the form of a housing cup. The first housing part is in particular shaped like an oil sump, in particular a flat oil sump. The second housing part is embodied in the form of a housing cover which can be connected to the first housing part.

The first housing part and the second housing part can be connected to each other in a material fit. The first housing part and the second housing part can in particular be glued or welded to each other at their mutually facing end faces. Alternatively, or additionally, the first housing part and the second housing part can be screwed to each other or otherwise connected to each other in a force fit and/or positive fit.

The reservoir 11, 12 is embodied between the first housing part and the second housing part. The reservoir 11, 12 is in particular enclosed by the first housing part and the second housing part. A baffle plate 13 which is formed in the first housing part sub-divides the reservoir 11, 12 into a main sump 11 and a secondary sump 12. The main sump 11 and the secondary sump 12 are fluidically connected to each other via the baffle plate 13. The fluid can in particular flow from the main sump 11 into the secondary sump 12 and vice versa, bypassing the baffle plate 13. A drain 72 is embodied in the secondary sump 12, in particular at the base of the secondary sump 12, wherein the fluid can be drained from the reservoir 11, 12, for example for a fluid change, via the drain 72. The drain 72 can for example be closed by a drain screw 70.

The housing 1, in particular the second housing part of FIG. 3, comprises a first suction port 21' and a second suction port 31'. The housing 1, in particular the second housing part, also comprises a first pressure port 22' and a second pressure port 32'. The first suction port 21' is preferably connected to the reservoir 11, 12, in particular the main sump 11, via a first suction conduit 21. The second suction port 31' is preferably connected to the housing 1 away from the reservoir 11, 12 via a second suction conduit 31. The second suction port 31' is in particular fluidically connected to the second return opening 25B via the second suction conduit 31. The upstream end of the second suction conduit 31 emerges on the side of the second return opening 25B which faces away from the machine assembly A.

The first pressure port 22' can be connected to the machine assembly A via a first pressure conduit 22. The first pressure conduit 22 can comprise different portions, wherein the individual portions can be embodied in or on the housing 1. The first pressure conduit 22 can in particular be divided downstream of the first pressure port 22' into a first supply conduit 23*a* and a second supply conduit 23*b*. The first supply conduit 23*a* and the second supply conduit 23*b* can be regarded as portions of the first pressure conduit 22.

In the present example embodiment of FIG. 3, a first portion 22*a* of the first pressure conduit 22 which is embodied in the housing 1 leads from the first pressure port 22' to the heat exchanger 4. After flowing through the heat exchanger 4, the fluid can flow through the housing 1 towards the at least one machine assembly A via the first supply conduit 23*a* and the second supply conduit 23*b*. The second pressure port 32' can be fluidically connected to the reservoir 11, 12, in particular the main sump 11, via a second pressure conduit 32.

The upstream end of the second suction conduit 31 emerges adjacently to the second return opening 25B, as can be seen in particular from FIG. 3. The upstream end of the second suction conduit 31 in particular emerges into the housing 1 below the second return opening 25B.

The first suction port 21' is connected to the reservoir 11, 12, in particular the main sump 11, via a first suction conduit 21. As shown for example in FIG. 2, the first suction conduit 21 is formed not or largely not by the first housing part and/or the second housing part. The first suction conduit 21 is formed partially by a tube portion. The tube portion of the first suction conduit 21 is formed separately from the first housing part and the second housing part. The tube portion of the first suction conduit 21 is arranged between the first housing part and the second housing part. The upstream end of the tube portion of the first suction conduit 21 emerges into the main sump 11, and its downstream end emerges into the first housing part. Alternatively, the upstream end of the tube portion of the first suction conduit 21 can emerge into the main sump 11, and its downstream end can emerge into the second housing part. The upstream end of the first suction conduit 21 and in particular the tube portion of the first suction conduit 21 forms an aspiration point via which the fluid can be aspirated from the main sump 11.

The part of the first suction conduit 21 which is not formed by the tube portion is formed by a channel in the first housing part, into which the tube portion emerges. The upstream end of the channel in the first housing part is connected to the tube portion, and its downstream end emerges on the end face of the first housing part. A part of the first suction conduit 21 is also formed by a channel in the second housing part, the upstream end of which emerges on the end face of the second housing part and the downstream end of which forms the first suction port 21'.

As shown in FIGS. 2 and 3, the first suction conduit 21 can be formed largely by a tube portion which is formed separately from the first housing part and the second housing part. Individual portions of the first suction conduit 21 can also be formed by channels in the first housing part and/or second housing part.

The first pressure conduit 22, in particular the individual portions 22*a*, 22*b*, 23*a*, 23*b* of the first pressure conduit 22, can be embodied by the first housing part and/or the second housing part. The first housing part and/or the second housing part can for example embody parts, in particular portions, of the first pressure conduit 22. The first housing part and/or the second housing part can then for example each comprise channel portions which are open towards the end face of the respective housing part and which form the first pressure conduit 22 or portions 22*a*, 22*b*, 23*a*, 23*b* of the first pressure conduit 22 when the two housing parts are joined, wherein two channel portions can respectively overlap each other or one channel portion can be closed by the other housing part. The first pressure conduit 22 can also for example be formed by channels in or through the first housing part and/or the second housing part.

In the example embodiment of FIGS. 2 and 3, the first portion 22*a* of the pressure conduit 22 is formed by a channel in the second housing part. The downstream end of the channel forms the first pressure port 22' and emerges on the end face of the second housing part. The first supply conduit and/or third portion 23*a* of the pressure conduit 22 is formed by a channel portion in the first housing part, which is open at the end face of the first housing part, and by a channel portion in the second housing part, which is open at the end face of the second housing part, wherein the two channel portions overlap each other when the two housing parts are joined. The second supply conduit and/or fourth portion 23*b* of the pressure conduit 22 is formed by a channel portion in the second housing part, which is open at the end face of the second housing part and is closed by the first housing part when the two housing parts are joined. The second portion 22*a* of the pressure conduit 22 is not shown in FIGS. 1 to 3 and extends within the pump housing 2 from the first pump 20, in particular the outlet of the first pump 20, to the first outlet of the pump module 20, 30 via the filter module 5.

The second suction conduit 31 can be formed by the first housing part and/or the second housing part. The first housing part and/or the second housing part can for example embody parts, in particular portions, of the second suction conduit 31. The first housing part and/or the second housing part can then for example each comprise channel portions which are open towards the end face of the respective housing part and which form the second suction conduit 31 or portions of the second suction conduit 31 when the two housing parts are joined, wherein two channel portions can respectively overlap each other or one channel portion can be closed by the other housing part. The second suction conduit 31 can also for example be formed by channels in or through the first housing part and/or the second housing part.

In the example embodiment of FIGS. 2 and 3, the second suction conduit 31 is formed by a channel portion in the first housing part, which is open towards the end face of the first housing part, and by another channel portion in the second housing part, which is open towards the end face of the second housing part. The two channel portions overlap each other when the housing 1 is joined and in this way form the second suction conduit 31. The second suction conduit 31 also extends partially as a channel through the second housing part, wherein the downstream end of the channel forms the second suction port 31'.

The second pressure conduit 32 can be formed by the first housing part and/or the second housing part. The first housing part and/or the second housing part can for example embody parts, in particular portions, of the second pressure conduit 32. The first housing part and/or the second housing part can then for example each comprise channel portions which are open towards the end face of the respective housing part and which form the second pressure conduit 32 or portions of the second pressure conduit 32 when the two housing parts are joined, wherein two channel portions can respectively overlap each other or one channel portion can be closed by the other housing part. The second pressure conduit 32 can also for example be formed by channels in or through the first housing part and/or the second housing part.

In the example embodiment of FIGS. 2 and 3, the second pressure conduit 32 is formed by a channel portion in the second housing part, which is open towards the end face of the second housing part, and a channel portion in the first housing part, which is open towards the end face of the first housing part. The two channel portions overlap each other when the housing parts are joined. The second pressure conduit 32 is also formed by a channel through the first housing part, the upstream end of which emerges in the end face of the first housing part and the downstream end of which emerges in the reservoir 11, 12, in particular the main sump 11, wherein the point at which the downstream end emerges overlaps with the channel portion in the second housing part. The second pressure conduit 32 also extends partially as a channel through the second housing part, wherein the upstream end of the channel forms the second pressure port 32'.

The pump module 20, 30 is preferably connected to the housing 1 via the first suction port 21', the second suction port 31', the first pressure port 22' and the second pressure port 32'. The pump module 20, 30 can in particular suction fluid from the reservoir 11, 12, in particular the main sump 11, via the first suction conduit 21 and the first suction port 21' and discharge the fluid towards the machine assembly A. The first pump 20 can be connected to the reservoir 11, 12 via the first suction conduit 21. The second pump 30 can be connected to the housing 1 via the second suction conduit 31.

For this purpose, the pump module 20, 30 comprises a first inlet (not shown in more detail) and a second inlet (not shown in more detail). The first inlet can be fluidically connected to the first suction port 21'. The second inlet can be fluidically connected to the second suction port 31'. The first inlet and the first suction port 21' can be connected directly to each other, such that the first inlet emerges into the first suction port 21' and the first suction port 21' emerges into the first inlet. Alternatively, the first inlet and the first suction port 21' can be connected to each other via a part of the first suction conduit 21. The second inlet and the second suction port 31' can be connected directly to each other, such that the second inlet emerges into the second suction port 31' and the second suction port 31' emerges into the second inlet. Alternatively, the second inlet and the second suction port 31' can be connected to each other via a part of the second suction conduit 31.

The pump module 20, 30 preferably comprises a first outlet (not shown in more detail) and a second outlet (not shown in more detail). The first outlet can be fluidically connected to the first pressure port 22'. The second outlet can be fluidically connected to the second pressure port 32'. The first outlet and the first pressure port 22' can be connected directly to each other, such that the first outlet emerges into the first pressure port 22' and the first pressure port 22' emerges into the first outlet. Alternatively, the first outlet and the first pressure port 22' can be connected to each other via a part of the first pressure conduit 22. The second outlet and the second pressure port 32' can be connected directly to each other, such that the second outlet emerges into the second pressure port 32' and the second pressure port 32' emerges into the second outlet. Alternatively, the second outlet and the second pressure port 32' can be connected to each other via a part of the second pressure conduit 32.

The pump module 20, 30 preferably comprises a first working flux which extends from the first inlet up to the second outlet. The pump module 20, 30 also preferably comprises a second working flux which extends from the second inlet up to the second outlet. The first working flux is preferably formed by the first pump 20 (not shown in more detail). The second working flux is preferably formed by the second pump 30 (not shown in more detail). The first working flux and the second working flux are fluidically delineated from each other.

Figure 4:
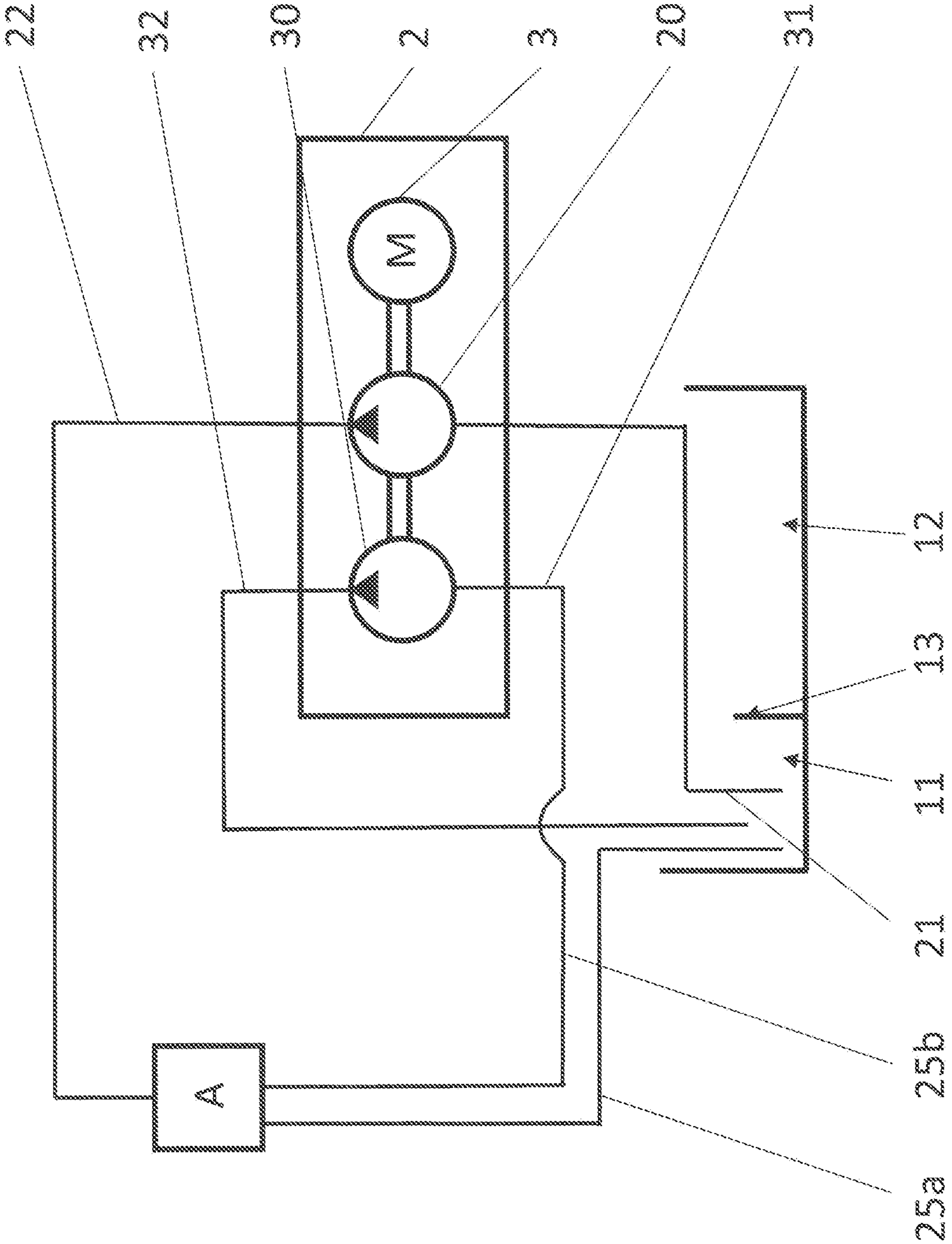
FIG. 4 a hydraulic circuit diagram of a first example embodiment.
Figure 5:
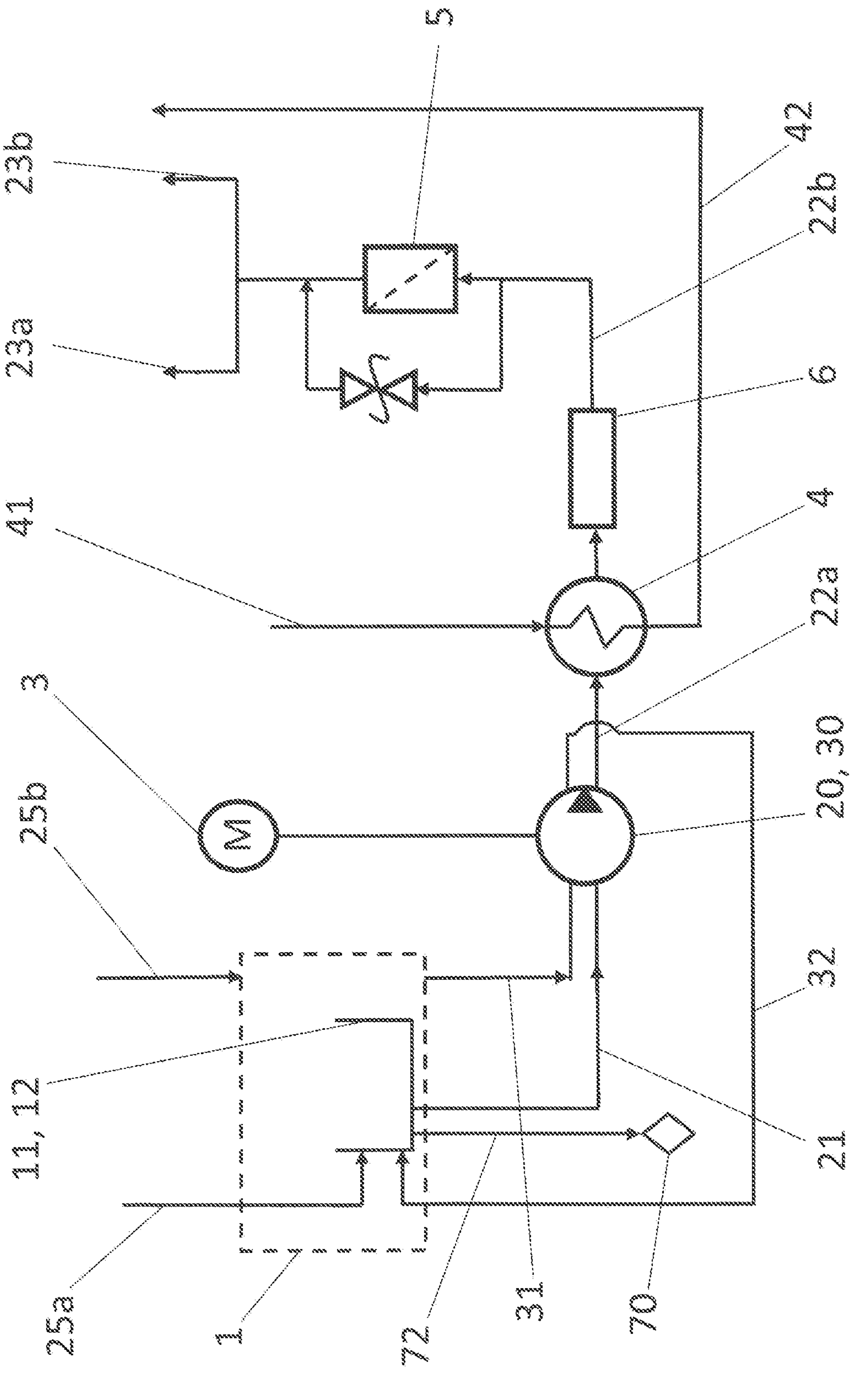
FIG. 5 a hydraulic circuit diagram of a second example embodiment.
Figure 6:
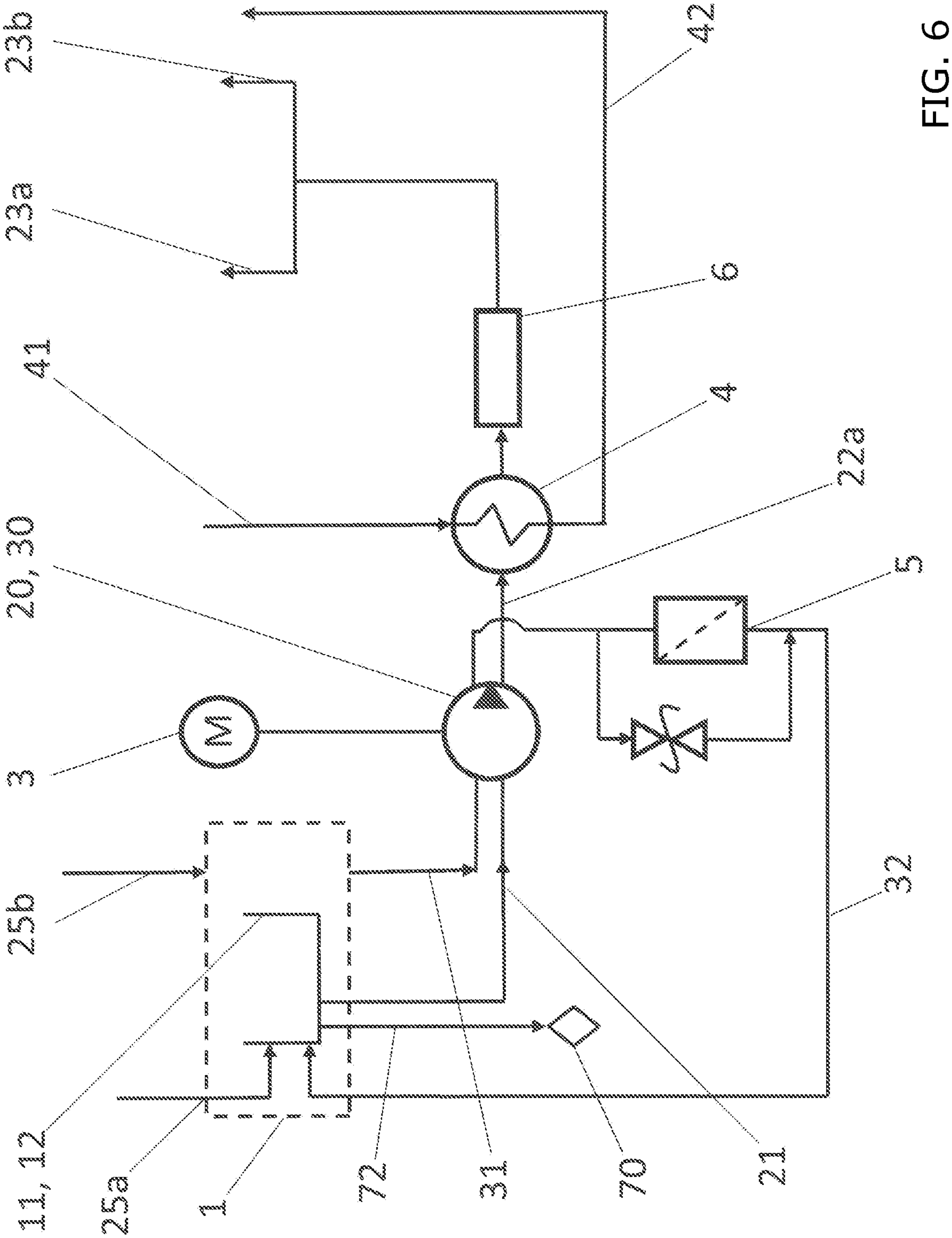
FIG. 6 a hydraulic circuit diagram of a third example embodiment.

FIGS. 4, 5 and 6 show hydraulic circuit diagrams of various embodiments. FIG. 4 shows a first example embodiment of a fluid delivery system. The fluid delivery system can be embodied in accordance with the fluid delivery system of FIGS. 1 to 3, such that the statements made with respect to FIGS. 1 to 3 likewise apply, providing they are not contradictory.

The fluid delivery system comprises: a housing 1 which comprises a reservoir 11, 12 for storing the fluid; a first pump 20 and a second pump 30; a drive 3 for the first pump 20 and the second pump 30; and a machine assembly A. The machine assembly A can be formed by an electric machine comprising an engine and a transmission. The first pump 20 and the second pump 30 preferably form a pump module 20, 30 together with the drive 3. The first pump 20 and the second pump 30 are seated on a common drive shaft and driven by the drive 3. The drive 3 can be formed by an electric motor.

The second pump 30 is embodied downstream of the first pump 20, i.e. the second pump 30 suctions fluid on its low-pressure side from the high-pressure side of the first pump 20. The second pump 30 is in particular also embodied downstream of the machine assembly A, i.e. the second pump 30 suctions fluid, which flows from the machine assembly A towards the housing 1, on its low-pressure side.

The pump module 20, 30 comprises a first working flux, which is formed by the first pump 20, and a second working flux which is formed by the second pump 30. The first working flux and the second working flux are fluidically separated from each other, such that the pump module 20, 30 is embodied as a multi-circuit pump module, in particular a dual-circuit pump module. The first working flux comprises a first low-pressure side and a first high-pressure side. The second working flux comprises a second low-pressure side and a second high-pressure side. The fluid circulation of the first working flux forms the supply flow of the fluid delivery system. The fluid circulation of the second working flux forms the sub-flow of the fluid delivery system.

The first working flux is connected to the reservoir 11, 12, in particular the main sump 11, via the first suction conduit 21 on the first low-pressure side. On the first high-pressure side, the first working flux is fluidically connected to the machine assembly A via the second pressure conduit 22. In this way, the first pump 20 suctions fluid from the reservoir 11, 12, in particular the main sump 11, and discharges it towards the machine assembly A. The fluid can flow back from the machine assembly A into the housing 1, in particular the reservoir 11, 12, via a first return line 25*a* and a second return line 25*b*.

In the present example embodiment, the supply flow can be divided within the machine assembly A into a first supply sub-flow and a second supply sub-flow, wherein the first supply sub-flow flows back into the housing 1, in particular the reservoir 11, 12, via the first return line 25*a* and the second supply sub-flow flows back into the housing 1, in particular the reservoir 11, 12, via the second return line 25*b*. The first supply sub-flow and the second supply sub-flow can supply fluid either to different locations in the same machine assembly A or to different machine assemblies A. Alternatively, the supply flow can also supply fluid to only one location in the machine assembly A and is not divided until it flows back towards the housing 1.

In alternative example embodiments such as for example the example embodiments of FIGS. 5 and 6, the pressure conduit 22 can be divided upstream of the machine assembly A into a first supply conduit 23*a* and a second supply conduit 23*b*. The first supply conduit 23*a* and the second supply conduit 23*b* can lead to the same machine assembly A or to different machine assemblies A.

The second working flux is connected, in particular fluidically, to the second return line 25*b* via the second suction conduit 31 on the second low-pressure side. The upstream end of the second suction conduit 31 emerges into the second return line 25*b* before the fluid can flow into the reservoir 11, 12 via an equalising conduit. The fluid which flows into the housing 1 via the second return line 25*b* and the second return opening 25B can, in an emergency, drain into the reservoir 11, 12, in particular the secondary sump 12, via the equalising conduit if the second pump 30 were for example to fail or the suction rate of the second pump fail 30 were to become too low to aspirate all of the fluid flowing back via the second return line 25*b*.

The second suction conduit 31 can for example emerge into the housing 1 below the second return opening 25B, as shown in FIGS. 1 to 3, wherein the second return opening 25B can emerge into the housing 1 away from the reservoir 11, 12, such that fluid which flows into the housing 1 via the second return opening 25B does not flow directly into the reservoir 11, 12. The upstream end of the second suction conduit 31 can emerge in the region of the return opening 25B. The second working flux is fluidically connected to the reservoir 11, 12, in particular the main sump 11, via the second pressure conduit 32 on the second high-pressure side.

Irrespective of the embodiment of the second suction conduit 31, the upstream end of the second suction conduit 31 emerges into the second return line 25*b* before the fluid flows into the reservoir 11, 12, i.e. the second pump 30 suctions the fluid flowing back from the machine assembly A and feeds it to the reservoir 11, 12, in particular the main sump 11, via the second pressure conduit 32.

In order to illustrate the principle of actively supplying fluid to the reservoir 11, 12, in particular the main sump 11, using the second pump 30, a filter module 5 and/or heat exchanger 4 have been omitted from the representation in FIG. 4. This is merely intended to aid comprehension. A filter module 5 can then for example be embodied upstream or downstream of the pump module 20, 30 in the supply flow. A filter module 5 can also for example be embodied in the sub-flow. A heat exchanger 4 can also be embodied upstream or downstream of the pump module 20, 30, in addition to or as an alternative to the filter module 5.

FIG. 5 shows for example a fluid delivery system comprising a heat exchanger 4 embodied in the supply flow and a filter module 5 embodied in the supply flow. In terms of the principle of actively supplying fluid to the reservoir 11, 12, in particular the main sump 11, the fluid delivery system of FIG. 5 does not differ from the example embodiment of FIG. 4. The statements made with respect to FIG. 4 apply correspondingly. The fluid delivery system can be embodied in accordance with the fluid delivery system of FIGS. 1 to 3, such that the statements made with respect to FIGS. 1 to 3 likewise apply, providing they are not contradictory.

As shown in FIG. 5, a heat exchanger 4 and a filter module 5 are arranged in the supply flow, in particular the first pressure conduit 22. The fluid flows from the pump module 20, 30 to the heat exchanger 4 via the first pressure conduit 22, in particular a first portion 22*a* of the pressure conduit 22. Alternatively, the heat exchanger 4 could also be arranged in the first suction conduit 21.

In the case of the fluid delivery system according to FIG. 1, the fluid flows back from the pump module 20, 30 into the housing 1 via the first pressure port 22', whence it is channeled into the heat exchanger 4 via the first portion of the pressure conduit 22*a*. In the heat exchanger 4, the fluid for supplying the machine assembly A discharges thermal energy to the fluid of the heat exchanger 4, in particular coolant, and is thus cooled. The fluid of the heat exchanger 4 flows through the heat exchanger 4, wherein the two fluids do not intermix with each other. The fluid of the heat exchanger 4 flows into the heat exchanger 4 via a first coolant conduit 41 and leaves the heat exchanger 4 via a second coolant conduit 42.

After the fluid for supplying the machine assembly A has flowed through the heat exchanger 4, it flows on towards the machine assembly A and the filter module 5 via a second portion 22*b* of the first pressure conduit 22. A sensor 6, in particular a temperature sensor 6 for measuring the temperature of the fluid, can be embodied in the second portion 22*b* of the first pressure conduit 22.

After the heat exchanger 4, the fluid flows through the filter module 5. The filter module 5 comprises a filter. The filter module 5 comprises a bypass valve which exhibits a first valve position and a second valve position. In the first valve position, the bypass valve does not allow any fluid to flow through the bypass valve. In the second valve position, the bypass valve allows flow to fluid through the bypass valve, in particular bypassing the filter.

After flowing through the filter module 5, the supply flow of FIG. 5 is divided into a first supply sub-flow and a second supply sub-flow, wherein the first supply sub-flow is fed to the machine assembly or assemblies A via the first supply conduit 23*a* and the second supply sub-flow is fed to the machine assembly or assemblies A via the second supply conduit 23*b*. In this way, fluid can for example be supplied to two locations in the machine assembly A and/or to two machine assemblies A.

The order in which the fluid flows through the heat exchanger 4 and the filter module 5 can be reversed. In the example embodiment of FIGS. 1 to 3, the fluid then for example flows firstly through the heat exchanger 4 and then through the filter module 5. In FIG. 1, the fluid flows through the filter module 5 and is then fed via the housing 1 to the heat exchanger 4 via the first portion 22*a* of the pressure conduit 22. After flowing through the heat exchanger 4 of FIG. 1, the fluid returns to the housing 1, where it is divided into two flows via the first supply conduit 23*a* and the second supply conduit 23*b*.

It is also possible for the heat exchanger 4 and the filter module 5 to both be arranged in the sub-flow of the fluid delivery system instead of the supply flow.

The example embodiment of FIG. 6 differs from the example embodiments of FIGS. 4 and 5 in that the filter module 5 is arranged in the sub-flow, while the heat exchanger 4 is arranged in the supply flow. The statements made with respect to FIGS. 1 to 5 apply accordingly, providing they are not contradictory.

The filter module 5 of FIG. 6 is arranged downstream of the second pump 30. In this way, the filter module 5 filters the fluid of the sub-flow. Since the fluid of the supply flow and the fluid of the sub-flow are intermixed with each other in the reservoir 11, 12, the fluid of the fluid delivery system as a whole is filtered over time.

LIST OF REFERENCE SIGNS

1 housing
2 pump housing
3 drive
4 heat exchanger
5 filter module
6 temperature sensor
11 main sump
12 secondary sump
13 baffle plate
20 first pump
21 first suction conduit
21' first suction port
22 first pressure conduit
22*a* first portion of the first pressure conduit
22*b* second portion of the first pressure conduit
22' first pressure port
23*a* first supply conduit/third portion of the first pressure conduit
23*b* second supply conduit/fourth portion of the first pressure conduit
25*a* first return line
25*b* second return line
25A first return opening
25B second return opening
30 second pump
31 second suction conduit
31' second suction port
32 second pressure conduit
32' second pressure port
41 first coolant conduit
42 second coolant conduit
70 drain screw
72 drain

The invention claimed is:

1. A fluid delivery system for supplying fluid to at least one machine assembly, which is an engine and/or transmission of a motor vehicle and is arranged in a machine assembly housing, comprises:

a. a pump module comprising a first pump and a second pump for delivering the fluid;

b. a drive comprising an electric motor for driving the pump module; and c. a housing, which comprises a reservoir for storing the fluid, a first housing part, and a second housing part, and which is separate from the machine assembly housing, d. wherein the reservoir comprises at least one aspiration point, and e. the pump module comprises a first inlet, a second inlet, a first outlet and a second outlet, and f. wherein the first inlet is fluidically connected to the reservoir via a first suction conduit, and the first outlet is fluidically connected to the machine assembly via a first pressure conduit, and g. the second inlet is fluidically connected to the housing via a second suction conduit, and the second outlet is fluidically connected to the reservoir via a second pressure conduit, h. wherein the first pressure conduit and the second pressure conduit are formed completely or partially between the first housing part and the second housing part, such that the first housing part and the second housing part define walls of the first pressure conduit along at least a same axial portion of the first pressure conduit, and define walls of the second pressure conduit along at least a same axial portion of the second pressure conduit, i. wherein the first housing part and/or the second housing comprise/comprises channel portions which are open towards the end face of the respective housing part, and which form the first pressure conduit or portions of the first pressure conduit or respectively the second pressure conduit or portions of the second pressure conduit when the two housing parts are joined, j. wherein the first pump and/or the second pump is/are formed by a rotary pump, and a rotor of the first pump and a rotor of the second pump are arranged on a drive shaft of the drive, and k. wherein the housing comprises at least a first return opening, via which the fluid can flow back from the machine assembly into the reservoir, and a second return opening via which the fluid can flow back from the machine assembly or another machine assembly into the housing.

2. The fluid delivery system according to claim 1, wherein the pump module comprises a first working flux, which extends from the first inlet up to the first outlet, and a second working flux which extends from the second inlet up to the second outlet, and wherein the first working flux and the second working flux are fluidically separated from each other.

3. The fluid delivery system according to claim 1, wherein the first suction conduit is a conduit which is completely or partially formed separately from the first housing part and the second housing part.

4. The fluid delivery system according to claim 3, wherein the first housing part is a housing cup and/or the second housing part is a housing cover.

5. The fluid delivery system according to claim 1, wherein the reservoir comprises a main sump and a secondary sump, and the first suction conduit emerges into the main sump via the aspiration point, and the second pressure conduit emerges into the main sump.

6. The fluid delivery system according to claim 1, wherein an upstream end of the second suction conduit emerges into the housing at a distance from a downstream end of the second pressure conduit.

7. The fluid delivery system according to claim 1, wherein the reservoir comprises a main sump and a secondary sump, and the first suction conduit emerges into the main sump via the aspiration point, and the second pressure conduit emerges into the main sump, wherein an upstream end of the second suction conduit emerges into the housing away from the main sump and/or secondary sump.

8. The fluid delivery system according to claim 1, wherein the first pump suctions the fluid via the first inlet and discharges it via the first outlet and the second pump suctions the fluid via the second inlet and discharges it via the second outlet.

9. The fluid delivery system according to claim 1, wherein a pump housing of the pump module is formed separately from the housing and is connected to the housing.

10. The fluid delivery system according to claim 9, wherein the common pump housing is screwed to the housing.

11. The fluid delivery system according to claim 1, wherein the fluid delivery system comprises at least one filter module comprising a filter, and the filter module is embodied downstream of the first outlet.

12. The fluid delivery system according to claim 1, wherein the fluid delivery system comprises at least one heat exchanger, and the heat exchanger is embodied on or in the housing.

13. The fluid delivery system according to claim 12, wherein the heat exchanger is embodied downstream of the first outlet.

14. The fluid delivery system according to claim 1, wherein the at least one machine assembly is an engine and/or transmission of a motor vehicle.

15. The fluid delivery system according to claim 1, wherein the rotary pump is an internal gear pump.

16. The fluid delivery system according to claim 1, wherein the reservoir comprises a main sump and a secondary sump, and an upstream end of the second suction conduit is connected to the housing in a location outside of the main sump and the secondary sump.

17. A fluid delivery system for supplying fluid to at least one machine assembly which is an engine and/or transmission of a motor vehicle and is arranged in a machine assembly housing, comprises:

a. a pump module comprising a first pump and a second pump for delivering the fluid;

b. a drive comprising an electric motor for driving the pump module; and c. a housing, which comprises a reservoir for storing the fluid, a first housing part, and a second housing part, and which is separate from the machine assembly housing, d. wherein the reservoir comprises at least one aspiration point, and e. the pump module comprises a first inlet, a second inlet, a first outlet and a second outlet, and f. wherein the first inlet is fluidically connected to the reservoir via a first suction conduit, and the first outlet is fluidically connected to the machine assembly via a first pressure conduit, and g. the second inlet is fluidically connected to the housing via a second suction conduit, and the second outlet is fluidically connected to the reservoir via a second pressure conduit, h. wherein the first pressure conduit and the second pressure conduit are formed completely or partially between the first housing part and the second housing part, such that the first housing part and the second housing part define walls of the first pressure conduit along at least a same axial portion of the first pressure conduit, and define walls of the second pressure conduit along at least a same axial portion of the second pressure conduit, i. wherein the first housing part and/or the second housing comprise/comprises channel portions which are open towards the end face of the respective housing part, and which form the first pressure conduit or portions of the first pressure conduit or respectively the second pressure conduit or portions of the second pressure conduit when the two housing parts are joined, j. wherein the first pump and/or the second pump is/are formed by a rotary pump, and a rotor of the first pump and a rotor of the second pump are arranged on a drive shaft of the drive, and k. wherein the housing comprises at least a first return opening, via which the fluid can flow back from the machine assembly into the reservoir, and a second return opening via which the fluid can flow back from the machine assembly or another machine assembly into the housing, and wherein the first return opening and/or the second return opening comprise(s) a screen on its/their side which faces the machine assembly.

18. The fluid delivery system according to claim 17, wherein the upstream end of the second suction conduit emerges into the housing on the side of the second return opening which faces away from the machine assembly.

* * * * *